(12) United States Patent
Mitsugi et al.

(10) Patent No.: US 9,430,254 B2
(45) Date of Patent: Aug. 30, 2016

(54) REGISTER MAPPING TECHNIQUES

(71) Applicant: INTERNATIONAL BUSINESS MACHINES CORPORATION, Armonk, NY (US)

(72) Inventors: Masanori Mitsugi, Kanagawa-ken (JP); Hiroyuki Tanaka, Kanagawa (JP); Nobuyoshi Tanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 13/727,474

(22) Filed: Dec. 26, 2012

(65) Prior Publication Data

US 2013/0167149 A1   Jun. 27, 2013

(30) Foreign Application Priority Data

Dec. 26, 2011   (JP) .................................. 2011-284197

(51) Int. Cl.
*G06F 9/455*   (2006.01)
*G06F 9/50*   (2006.01)

(52) U.S. Cl.
CPC ........... *G06F 9/455* (2013.01); *G06F 9/45533* (2013.01); *G06F 9/45558* (2013.01); *G06F 9/5077* (2013.01); *Y02B 60/142* (2013.01); *Y02B 60/167* (2013.01)

(58) Field of Classification Search
None
See application file for complete search history.

(56) References Cited

U.S. PATENT DOCUMENTS

| | | | | |
|---|---|---|---|---|
| 7,191,440 B2 * | 3/2007 | Cota-Robles | ......... | G06F 9/4881 714/E11.2 |
| 7,912,988 B2 * | 3/2011 | Boyd | ...................... | H04L 69/16 709/230 |
| 8,046,521 B2 * | 10/2011 | Takashige | ........... | G06F 12/1036 711/1 |
| 8,055,827 B2 * | 11/2011 | Serebrin | ............... | G06F 9/4812 710/200 |
| 8,060,722 B2 * | 11/2011 | Adams | ................ | G06F 12/1009 710/100 |
| 8,108,872 B1 * | 1/2012 | Lindholm | ............. | G06F 9/5016 718/104 |

(Continued)

FOREIGN PATENT DOCUMENTS

JP       61114546 A   6/1986
JP    2006-502470 A   1/2006

(Continued)

*Primary Examiner* — Steven Snyder
(74) *Attorney, Agent, or Firm* — Michael R. Long; Steven L. Bennett

(57) ABSTRACT

A technique for register mapping in a virtual system includes preparing a register pool that includes a plurality of registers for mapping. A mapping table is prepared that has a register identifier (ID) and information related to each of a plurality of parameters that express an operational state of the virtual system for each of the registers. At the time a register access request is issued by a hardware thread, the register ID for an access target and information related to each of the plurality of parameters that express the operational state during operation is acquired. One of the registers, for which the acquired register ID and information related to each of the plurality of parameters match the register ID and information for each of the plurality of parameters within the mapping table, is set as a mapped register to be accessed per the register access request.

8 Claims, 5 Drawing Sheets

(56) References Cited

U.S. PATENT DOCUMENTS

| | | | | |
|---|---|---|---|---|
| 8,180,944 B2* | 5/2012 | Serebrin | G06F 9/4812 | 710/269 |
| 8,219,779 B2* | 7/2012 | Adams | G06F 12/1009 | 711/206 |
| 8,234,432 B2* | 7/2012 | Serebrin | G06F 9/4812 | 710/261 |
| 8,266,633 B1* | 9/2012 | Saulsbury | G06F 9/45558 | 718/1 |
| 8,443,156 B2* | 5/2013 | Adams | G06F 12/1063 | 711/141 |
| 8,484,392 B2* | 7/2013 | Manula | G06F 9/5077 | 709/213 |
| 8,707,332 B2* | 4/2014 | Saulsbury | G06F 9/45558 | 718/1 |
| 8,762,684 B2* | 6/2014 | Adams | G06F 12/1009 | 711/141 |
| 8,788,790 B2* | 7/2014 | Brandt | G06F 9/4843 | 711/209 |
| 8,838,914 B2* | 9/2014 | Adams | G06F 12/1063 | 711/141 |
| 9,191,454 B2* | 11/2015 | Fries | H04L 67/2861 | |
| 9,304,915 B2* | 4/2016 | Adams | G06F 12/1063 | |
| 9,311,122 B2* | 4/2016 | Guay | G06F 9/4856 | |
| 2003/0226001 A1 | 12/2003 | Moyer et al. | | |
| 2004/0049580 A1* | 3/2004 | Boyd | H04L 69/16 | 709/226 |
| 2004/0268093 A1 | 12/2004 | Samra | | |
| 2006/0259644 A1* | 11/2006 | Boyd | H04L 69/16 | 709/250 |
| 2007/0028151 A1* | 2/2007 | Miller | G06F 9/4843 | 714/49 |
| 2009/0164991 A1* | 6/2009 | Takashige | G06F 12/1036 | 718/1 |
| 2011/0004791 A1* | 1/2011 | Kokubu | G06F 11/0712 | 714/57 |
| 2011/0093750 A1* | 4/2011 | Williams | G06F 9/5077 | 714/47.2 |
| 2013/0097360 A1* | 4/2013 | Brandt | G06F 9/4843 | 711/6 |
| 2013/0124840 A1* | 5/2013 | Diluoffo | G06F 21/575 | 713/2 |
| 2013/0212314 A1* | 8/2013 | Brandt | G06F 9/4843 | 711/6 |
| 2014/0047150 A1* | 2/2014 | Marietta | G06F 13/14 | 710/264 |
| 2014/0181830 A1* | 6/2014 | Naik | G06F 9/461 | 718/104 |
| 2015/0089271 A1* | 3/2015 | Shimizu | G06F 12/0292 | 714/4.1 |
| 2015/0089495 A1* | 3/2015 | Persson | G06F 9/45558 | 718/1 |

FOREIGN PATENT DOCUMENTS

| | | |
|---|---|---|
| JP | 2007-520768 A | 7/2007 |
| WO | 2011093750 A2 | 8/2011 |
| WO | 2011093750 A3 | 11/2011 |

* cited by examiner

Fig 6

| | Register ID | GS | LPID | TID | Check Mask |
|---|---|---|---|---|---|
| UREG0 | 10 | 1 | 1 | | GS, LPID |
| UREG1 | 10 | 1 | 3 | | GS, LPID |
| UREG2 | 11 | | | 3 | TID |
| UREG3 | 12 | 1 | | | GS |
| ... | ... | ... | ... | ... | ... |

REGISTER MAPPING TECHNIQUES

This application claims priority to Japanese Patent Application No. 2011-284197, entitled "REGISTER MAPPING METHOD," filed Dec. 26, 2011, the disclosure of which is hereby incorporated herein by reference it its entirety for all purposes.

BACKGROUND

The present disclosure generally relates to register mapping and, more specifically, to register mapping techniques for virtual systems in which a hypervisor and multiple operating systems operate using of a plurality of hardware threads.

Today, most processors are loaded with hardware functions (e.g., resister mapping) that support virtualization for running a plurality of operating systems (OSs) on a single system. Register mapping is a function for enabling software (e.g., a hypervisor) that administers multiple OSs, or the multiple OSs themselves, to efficiently access registers. An OS that runs on a virtual system is generally referred to as a guest OS or simply an OS. When executing virtualization on a processor without support for register mapping, the hypervisor and the OS share a single register. When there is a transition from the OS operating state to the hypervisor operating state, the content of the single register is shifted to temporary memory, which significantly degrades performance.

To address the performance degradation attributable to shifting the content of the single register between an OS and hypervisor, at least one conventional register mapping technology has provided one register for hypervisor operational use and another register for OS operational use. In this case, hardware automatically determined whether the current operational mode was the hypervisor or the OS and switched the location for a register access using the same register command, as appropriate. Unfortunately, the registers that support register mapping for conventional register mapping technologies are limited and, as such, memory evacuation of the content of unsupported registers is still required at operational switching.

Moreover, known shared processor functions execute shared use of a single processor core with multiple OSs by time-division (or another policy) in order to attain higher functionality through virtualization. However, when the shared processor function is used, register switching occurs between the hypervisor and multiple OSs which further degrades performance. For example, in conventional technologies that implement a shared processor function with a single register assigned for OS use, at the time of a shift between OSs the temporary evacuation of content of the single register degrades performance. Moreover, in systems that implement a multithreading mechanism that provides multiple hardware threads, performance is also degraded because a plurality of hardware threads operate on a single processor core and registers are classified based on which registers can be accessed by each thread. In this case, it is also possible to prepare all the registers for use by each thread, but the register count increases which adversely affects cost and power consumption.

Japanese Laid-Open Publication No. 2009-151650 discloses a computer virtualization device that operates a plurality of OSs within a computer to provide a plurality of virtualized computers. The computer virtualization device provides a memory space identifier on the virtualized computer (i.e., guest register identifier (RID)), a mapping table for administering correspondence of an identifier (physical RID) to be used by the actual computer, an RID converter for referencing the mapping table and converting a guest RID to a physical RID when triggering an emulation process to substitute a guest RID, and an RID table update component for creating a new correspondence and adding it to the mapping table when a correspondence between a guest RID and a physical RID does not exist in the mapping table.

SUMMARY

According to one aspect of the present disclosure, a technique for register mapping (in a virtual system that implements a hypervisor and at least two operating systems that are operable while executing at least two hardware threads) includes preparing a register pool that includes a plurality of registers for mapping. A mapping table is also prepared that has a register identifier (ID) and information related to each of a plurality of parameters that express an operational state of the virtual system for each of the registers. At the time a register access request is issued by a hardware thread, the register ID for an access target and information related to each of the plurality of parameters that express the operational state during operation is acquired. One of the registers, for which the acquired register ID and information related to each of the plurality of parameters match the register ID and information for each of the plurality of parameters within the mapping table, is set as a mapped register to be accessed per the register access request.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

FIG. 6 is an exemplary mapping table configured according to the present disclosure.

DETAILED DESCRIPTION

Figure 1:
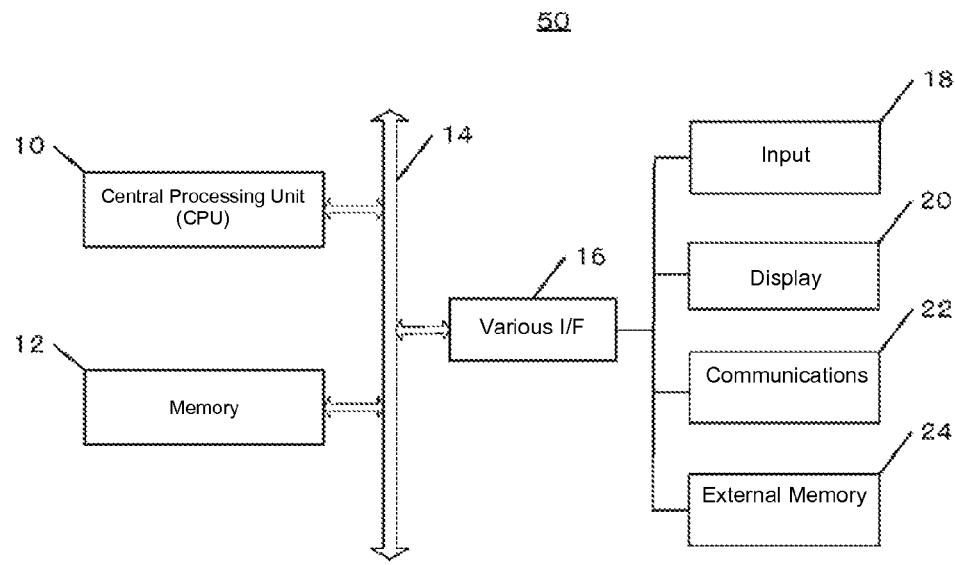
FIG. 1 is a diagram of an exemplary data processing system for executing register mapping according to the present disclosure.

As will be appreciated by one skilled in the art, aspects of the present invention may be embodied as a system, method, or computer program product (e.g., in the form of one or more design files). Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium include: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider (ISP)).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. As may be used herein, the term "coupled" includes both a direct electrical connection between blocks or components and an indirect electrical connection between blocks or components achieved using one or more intervening blocks or components.

According to the present disclosure, register mapping techniques are disclosed that address problems with conventional register mapping technologies. Specifically, the disclosed register mapping techniques improve register access performance in virtual systems in which a hypervisor and multiple operating systems (OSs) are capable of operating through the use of a plurality of hardware threads. The register mapping techniques map registers for virtual systems in which a hypervisor and two or more OSs are capable of operating through the use of two or more hardware threads.

According to one embodiment, the register mapping technique prepares a register pool that includes a plurality of registers for mapping and prepares a mapping table that has set, for each register for mapping within the register pool, a register identifier (ID) and information related to each of a plurality of parameters that express an operational state of a virtual system. According to one or more embodiments, a register mapping technique includes acquiring, at the time a register access request has been issued by a hardware thread, a register ID for an access target and information related to each of a plurality of parameters that express an operational state during operation. The register mapping technique further includes setting one of the registers, for which the acquired register ID and information related to each of the plurality of parameters match the register ID and information for each of the plurality of parameters within the mapping table, as a mapped register to be accessed per the register access request.

According to the present disclosure, implementing a mapping table facilitates efficient access of a register via a register access request in a virtual system that implements multi-threading. According to one embodiment, a plurality of parameters that express the operational state within the mapping table include an operation ID that expresses whether the hypervisor is operating or an OS is operating, an ID for each OS, and an ID for each hardware thread. In one or more embodiments, the mapping table includes, for each register, a check mask for specifying what parameter information is used to check whether or not there is a match with the parameters selected from among the operation ID, the ID for OS, and the ID for the hardware thread. By changing the check item within the mapping table in response to the operation state, the type of OS, or the type of hardware thread, a register may be efficiently accessed.

The setting of the register to be accessed via a register access request may include determining whether or not there is match of the information for the parameters specified by the check mask within the mapping table. When the information for the acquired register ID does not match the information for a register ID within the mapping table, another register (e.g., other than a register within the register pool) may be set as the register to be accessed per the register access request.

FIG. 1 illustrates an exemplary computer system 50 for executing register mapping according to the present disclosure. Computer system 50 includes a central processing unit (CPU) 10, a memory 12, and an interface (I/F) 16, all of which are reciprocally connected through bus 14. I/F 16 generally encompasses an input I/F, an output I/F, an external memory I/F, and an external communications I/F. I/F 16 is coupled to input device 18 (which may include, for example, a keyboard, a mouse, and a ten-key), to display 20 (which may include, for example, a cathode ray tube (CRT) or liquid crystal display (LCD), to communications device 22, and to external memory 24 (e.g., semiconductor memory, hard-disk drive (HDD) or tape drive with a universal serial bus (USB) or a local area network (LAN) connection.

In accordance with the execution of prescribed software, CPU 10 administers and controls data stored in memory 12 and data to be transceived through communications device 22, and controls information input from input device 18, as well as information to be displayed by display 20. Memory 12 may include a semiconductor memory, such as random access memory (RAM) or read-only memory (ROM), or an HDD. Memory 12 is capable of setting a plurality of memory units (storage units) according to a storage target (data). Memory 12 can, for example, establish two physical memories or establish two memory regions in a single memory.

Figure 2:
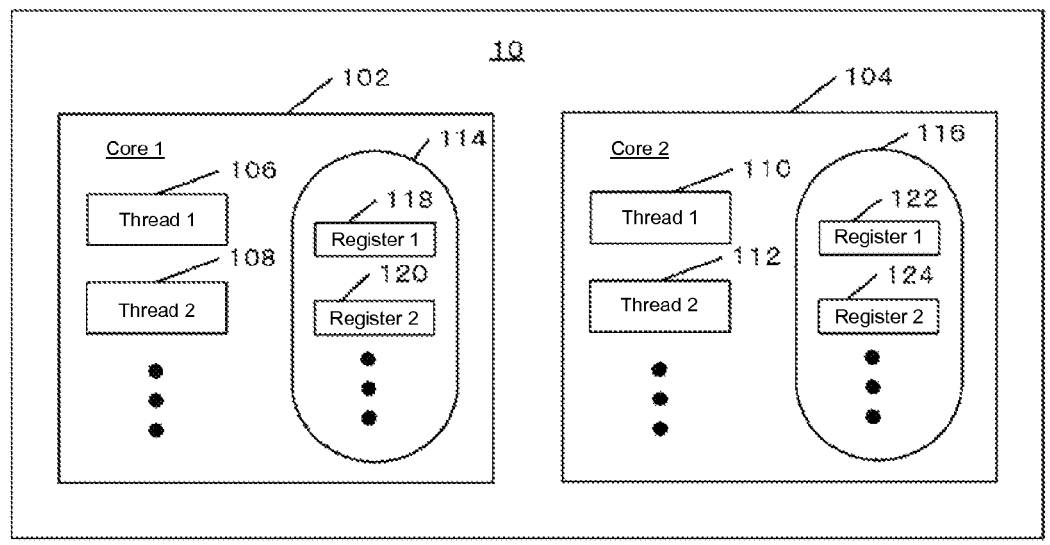
FIG. 2 is a block diagram of an exemplary central processing unit (CPU) of the system of FIG. 1.

FIG. 2 is a block diagram that shows a structural example of CPU 10 of FIG. 1 that uses a multi-threading structure with, for example, a Power Architecture as the base. The CPU 10 enables a hypervisor and at least two OSs to operate as virtual systems. CPU 10 provides two cores: core 102 (labeled "core 1"); and core 104 (labeled "core 2"). It should be appreciated that the quantity of cores in CPU 10 is not limited to two. As is illustrated, core 102 includes multiple hardware threads 106 and 108 and core 104 includes hardware threads 110 and 112. Each thread 106-112 represents a computational processing unit that can be thought of as hardware. It should be appreciated that the quantity of threads may be discretionarily set.

Core 102 includes at least one register pool 114 and core 104 includes at least one register pool 116. Register pool 114 represents a collection of mappable general-purpose registers 118 and 120. Similarly, register pool 116 represents a collection of mappable general-purpose registers 122 and 124. The quantity of general-purpose registers 114 and 116 may also be discretionarily set.

Figure 3:
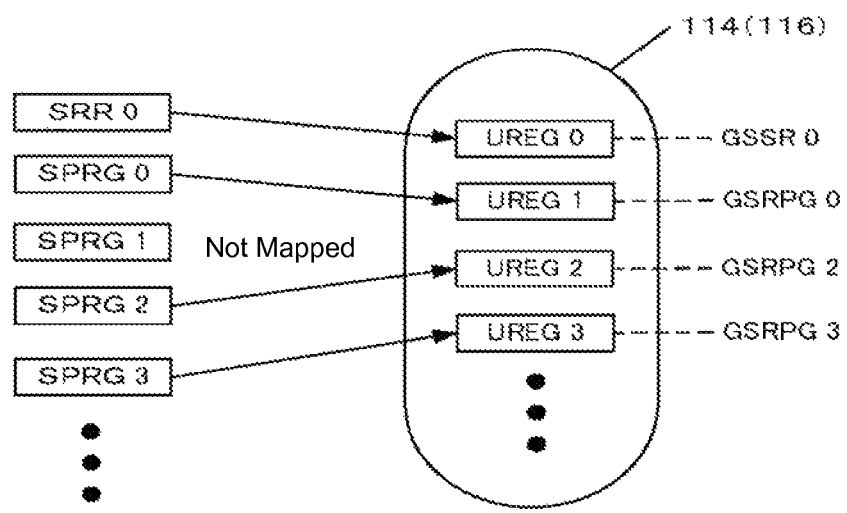
FIG. 3 is an exemplary diagram that further illustrates register mapping using a register pool according to the present disclosure.

FIG. 3 illustrates register mapping utilizing a register pool according to the present disclosure. As illustrated, register pool 114 includes mappable general-purpose registers UREG 0-3. Each general-purpose register UREG 0-3 corresponds to a GSSR or GSSRPG 0-3, which correspond to a used OS register (with the correspondence shown by the broken line in the drawing). Each UREG 0-3 is also related to a register which may become the access target for the hypervisor operation mode, as shown by the five blocks SPR 0 and SPRG 0-3 at the left of FIG. 3. In each hypervisor operation mode, any of general-purpose registers UREG 0-3 may be operated as accessible mapping registers. It should be appreciated that correspondence between the general-purpose registers and an OS is set-up in advance.

Figure 4:
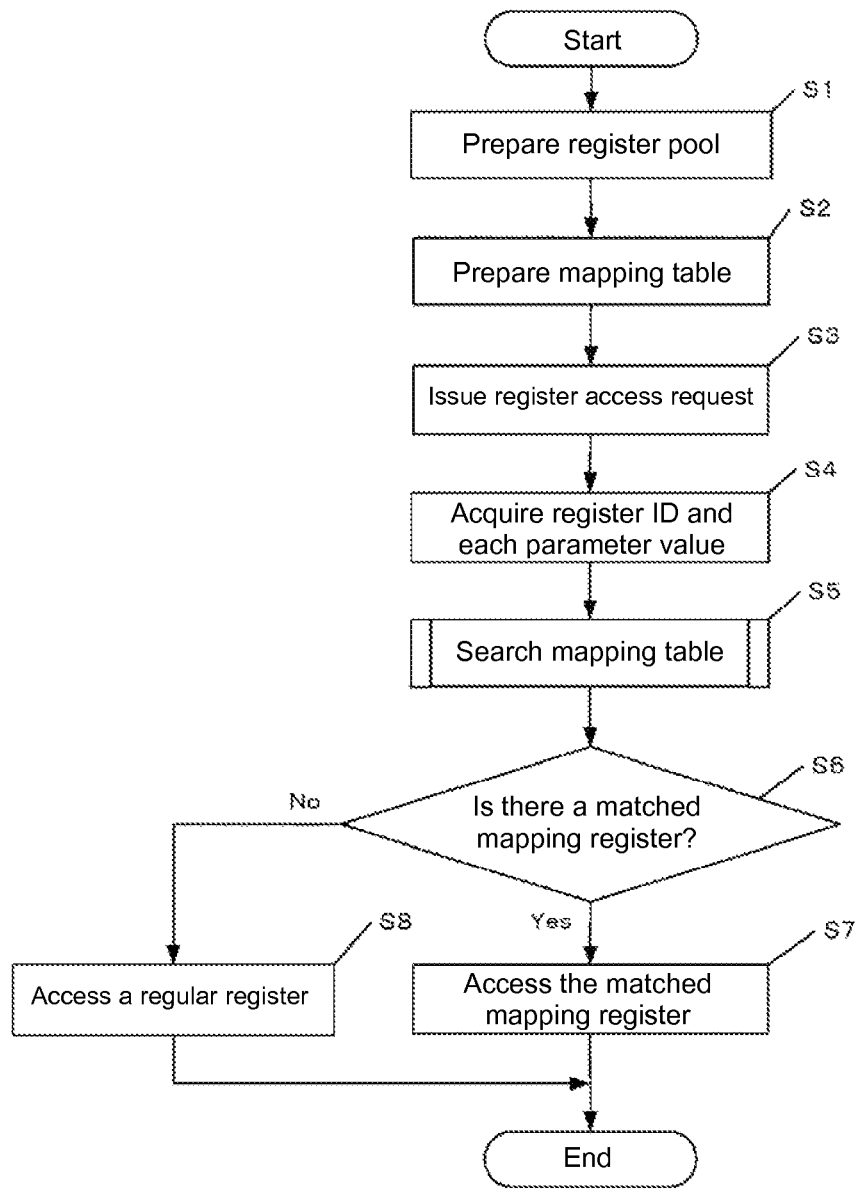
FIG. 4 is a flowchart of an exemplary register mapping technique according to the present disclosure.
Figure 5:
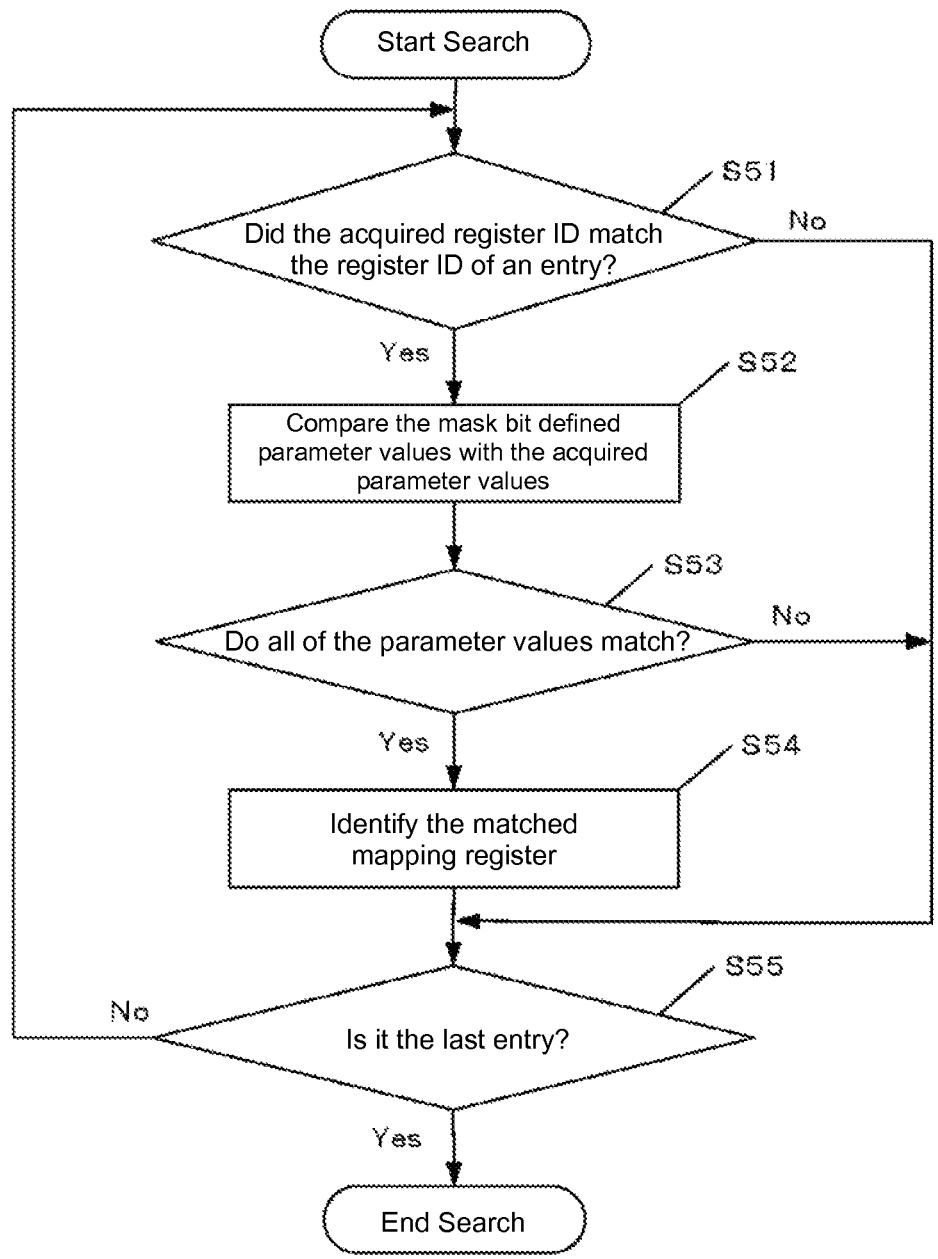
FIG. 5 is a flowchart of an exemplary process for searching a mapping table according to the present disclosure.

According to aspects of the present disclosure, an access to SPRG 1, which is shown as "Not mapped" in FIG. 3, occurs without accessing a mapping register and without relation to an operation mode. FIG. 4 shows an example of the processing flow for the disclosed register mapping techniques. FIG. 5 shows an example of the processing flow for a search of a mapping table (or other data structure) configured according to the present disclosure. FIG. 6 shows a structure of the mapping table according to one or more embodiments.

At block S1 of FIG. 4, a register pool is prepared. Preparation of the register pool includes setting register pools 114 and 116, see FIGS. 2 and 3, to a usable state (i.e., an accessible state). At block S2, the mapping table is prepared. Preparation of the mapping table includes calling up the mapping table, which is stored in memory 12 (FIG. 1), and setting it to a usable state. FIG. 6 illustrates a structural example relevant to when the mapping table is utilized for a register group standardized on the Power Instruction Set Architecture (Power ISA) of the Power Architecture. The mapping table includes, as parameters, for each mapping register UREG 0-3 within register pools 114 and 116, a register identifier (Register ID), information that indicates either hypervisor operation or OS operation (labeled "GS"), a logical partition ID for an OS (labeled "LPID"), a value (bit information) for thread ID (labeled "TID"), and mask information (labeled "Check Mask") for stipulating whether to check the GS, LPID or TID.

The GS cell is either set to a value of zero, indicating hypervisor operation, or a value of one, indicating OS operation. The LPID cell and the TID cell include a pre-assigned OS ID (e.g., 1, 2, 3 . . . ) and a thread ID (e.g., 1, 2, 3 . . . ), respectively. As an example for mapping register UREG 1, register ID number 10 is set for OS operation (GS=1), the OS ID is 3 (LPID=3), and the checking of the two parameters is stipulated by the check mask (i.e., Check Mask=GS, LPID). It should be appreciated that the mapping table shown in FIG. 6 may be only one section of an overall data structure and the parameters included therein are not limited to those described. For example, parameters may be added and/or changed.

With reference again to FIG. 4, at block S3, a request for access to a particular register is issued by software that includes the OS. At block S4, the register ID (number) and parameter values are acquired in conjunction with a register access request. The parameter values are associated with GS, LPID, and TIG, which concern registers standardized to the Power Architecture related Power ISA within the mapping table shown as an example in FIG. 6 and described above. In this example, GS, LPID, and TID are values that operate when a corresponding access request is issued at block S3, and the values correspond to values for hypervisor operation or OS operation and for OS and thread identification. With the Power Architecture related Power ISA, in response to a write/read command (e.g., move to special purpose register (mtspr)/move from special purpose register (mfspr)) for a register, by referencing the bit in each register the GS value (0 or 1) (in this case, MSR [GS]), the LPID (which shows the OS ID) from the LPIDR register, and the TID (which shows the thread ID) from the TID register may be acquired. At block S5, the mapping table is searched.

The mapping table search is further described with reference to FIG. 5. At block S51, a determination is made as to whether the acquired register ID matches the register ID of an entry in the mapping table. The register ID of the entry represents an ID for a register within the mapping table (the Register ID in FIG. 6, for example). In response to the acquired register ID not matching the register ID of the entry control transfers to block S55. In response to the acquired register ID matching the register ID of the entry control transfers to block S52. In this case, the entry (register information) that has the register ID matched within the mapping table and the parameter values for the mask bits are compared with each of the acquired parameter values. A parameter value for a mask bit corresponds to the parameter value (a value for any of GS, LPID or TID) to be checked due to being set by the mask information (Check Mask) of FIG. 6.

At block S53, a determination is made as to whether all of the parameter values match for the entry that has the matched register ID. For example, when register UREG 1 of FIG. 6 corresponds to an entry with a matching register ID, a determination is made as to whether the value for GS and LPID (set by the mask information (Check Mask)) both match. In response to all of the parameter values not matching for the entry that has the matched register ID control transfers to block S55. In response to all of the parameter values matching for the entry that has the matched register ID control transfers to block S54. In block S54 the register that has matched all of the parameter values is identified (selected) as the matched mapping register. Next, in block S55, a determination is made as to whether or not the entry (register) is the last entry in the mapping table. In response to the entry not being the last entry in the mapping table in block S55, control transfers to block S51. In response to the entry being the last entry in the mapping table in block S55, control transfers to the end search block, where the search is terminated and control returns to a calling process.

With reference again to FIG. 4, at block S6, a determination is made as to whether a matched mapping register exists. A matched mapping register is a matched mapping register identified (selected) at block S54 of FIG. 5. If a matched mapping register is identified, the matched mapping register is accessed as a register for access per the access request for the register at block S3. If a matched mapping register is not identified in block S6, a general register that is not a mapping register within register pools 114 and 116 is accessed as a register for access per the access request for the register at block S3.

As one example of register mapping according to the present disclosure, an exception syndrome register (ESR) in the Power Architecture may be register mapped. An ESR is a register that saves detailed information for exception processing at the time the exception processing is performed in the system. System exception processing includes both (i) system fatal exception processing the hypervisor is expected to perform, and (ii) exception processing the OS is expected to perform. With conventional systems, detailed information about these types of processing were saved separately, with the exception processing detailed information for the hypervisor being stored in the ESR register and the exception processing detailed information for the OS being stored in the GESR register. In such a case, when a single OS was operating, it was necessary to evacuate the information saved in the GESR register, but when a plurality of OS were operating, switch processing was required to evacuate the information in the GESR register to temporary memory. This switch processing was conventionally performed by the hypervisor as an intermediary between each OS, and a processing request to the hypervisor was needed for each instance of switch processing.

According to the present disclosure, due to the ability to secure a plurality of GESR registers, processing requests to the hypervisor in conjunction with switch processing is unnecessary and efficient virtualization for the system is made possible. For example, when processing in the situation wherein the ESR has been accessed to allow the OS to generate exception processing for itself, the process proceeds in the following order. First, the OS issues the CPU mtspr command for saving detailed information to the ESR. Second, the information (values) of GS, LPID and TID are added within the CPU, and a request for processing is made to the register Save/Restore processor. It should be appreciated, at this point in time with a conventional system having only one GESR register, it was necessary to evacuate the current GESR contents and, as such, processing was shifted to the hypervisor to evacuate the current GESR to memory. Third, referencing of the mapping table is performed based on the added GS, LPID and TID information (i.e., processing is not shifted to the hypervisor). Fourth, after accessing the identified mapping register or regular register and saving the content, processing returns to the OS that issued the CPU mtspr command.

Accordingly, techniques have been disclosed herein that advantageously perform register mapping in a relatively efficient manner.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer program product, comprising:
a computer-readable storage medium; and
code embodied on the computer-readable storage medium for register mapping in a virtual system that implements a hypervisor and at least two operating systems that are operable while executing at least two hardware threads, wherein the code, when executed by a data processing system, is configured to:
prepare a register pool that includes a plurality of registers for mapping;
prepare a mapping table that has a register identifier (ID) and information related to each of a plurality of parameters that express an operational state of the virtual system for each of the registers;
acquire, at the time a register access request is issued by a hardware thread, the register ID for an access target and information related to each of the plurality of parameters that express the operational state during operation; and
set one of the registers, for which the acquired register ID and information related to each of the plurality of parameters match the register ID and information for each of the plurality of parameters within the mapping table, as a mapped register to be accessed per the register access request, wherein the plurality of parameters that express the operational state within the mapping table include an operation ID that expresses whether the hypervisor is operating or an operating system (OS) is operating, an ID for each OS, and an ID for each hardware thread.

2. The computer program product of claim 1, wherein the mapping table includes, for each of the registers that is mapped, a check mask for specifying what parameter information is used to check whether or not there is the match with the parameters selected from among the operation ID, the ID for OS, and the ID for the hardware thread.

3. The computer program product of claim 2, wherein the setting the register to be accessed per the register access request includes determining whether or not there is a match of the information for the parameters specified by the check mask within the mapping table.

4. The computer program product of claim 1, wherein, in response to the information for the acquired register ID not matching the information for a register ID within the mapping table, a register other than one of the registers within the register pool is set as the register to be accessed per the register access request.

5. The computer program product of claim 2, wherein, in response to the information for the acquired register ID not matching the information for a register ID within the mapping table, a register other than one of the registers within the register pool is set as the register to be accessed per the register access request.

6. A data processing system, comprising:
a memory; and
a processor coupled to the memory, wherein the processor is configured to:
prepare a register pool that includes a plurality of registers for mapping;
prepare a mapping table that has a register identifier (ID) and information related to each of a plurality of parameters that express an operational state of the virtual system for each of the registers;
acquire, at the time a register access request is issued by a hardware thread, the register ID for an access target and information related to each of the plurality of parameters that express the operational state during operation; and
set one of the registers, for which the acquired register ID and information related to each of the plurality of parameters match the register ID and information for each of the plurality of parameters within the mapping table, as a mapped register to be accessed per the register access request, wherein the plurality of parameters that express the operational state within the mapping table include an operation ID that expresses whether the hypervisor is operating or an operating system (OS) is operating, an ID for each OS, and an ID for each hardware thread.

7. The data processing system of claim 6, wherein the mapping table includes, for each of the registers that is mapped, a check mask for specifying what parameter information is used to check whether or not there is the match with the parameters selected from among the operation ID, the ID for OS, and the ID for the hardware thread.

8. The data processing system of claim 7, wherein the setting the register to be accessed per the register access request includes determining whether or not there is a match of the information for the parameters specified by the check mask within the mapping table.

* * * * *